United States Patent
Kobaslija et al.

(10) Patent No.: US 11,007,511 B2
(45) Date of Patent: May 18, 2021

(54) METHODS FOR THE SYNTHESIS OF TUNABLE MESOPOROUS ZEOLITES

(71) Applicant: Saudi Arabian Oil Company, Dhahran (SA)

(72) Inventors: Sarah L. Kobaslija, Arlington, MA (US); Jeremy Thomas O'Brien, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 313 days.

(21) Appl. No.: 15/974,154

(22) Filed: May 8, 2018

(65) Prior Publication Data
US 2019/0344251 A1 Nov. 14, 2019

(51) Int. Cl.
| | |
|---|---|
| *C01B 39/48* | (2006.01) |
| *B01J 29/70* | (2006.01) |
| *B01J 29/04* | (2006.01) |
| *B01J 37/00* | (2006.01) |
| *B01J 37/04* | (2006.01) |
| *B01J 37/08* | (2006.01) |
| *B01J 37/10* | (2006.01) |

(52) U.S. Cl.
CPC .......... *B01J 29/041* (2013.01); *B01J 29/7007* (2013.01); *B01J 37/0018* (2013.01); *B01J 37/04* (2013.01); *B01J 37/082* (2013.01); *B01J 37/10* (2013.01); *C01B 39/48* (2013.01); *C01P 2006/17* (2013.01)

(58) Field of Classification Search
CPC ..... C01B 39/48; C01P 2006/17; B01J 29/041; B01J 29/7007; B01J 37/0018
See application file for complete search history.

(56) References Cited

U.S. PATENT DOCUMENTS

7,785,563 B2 * 8/2010 Ryoo .............. C01B 39/40
                                                      423/703
2016/0137517 A1  5/2016  Nicolas et al.
2017/0073557 A1  3/2017  Kageyama et al.

FOREIGN PATENT DOCUMENTS

EP       1679286 A1    7/2006
IN    730/DEL/2011 A  10/2012
(Continued)

OTHER PUBLICATIONS

"Verified Synthesis of Zeolitic Materials", Second Revised Edition, Robson et al, 2001 (Year: 2001).*

(Continued)

*Primary Examiner* — David M Brunsman
(74) *Attorney, Agent, or Firm* — Dinsmore & Shohl LLP (57) ABSTRACT

Methods of forming mesoporous zeolites with tunable pore widths are provided. In some embodiments, the method includes mixing a silicon-containing material, an aluminum-containing material, and at least a quaternary amine to produce a zeolite precursor solution. The zeolite precursor solution is pre-crystallized at a pre-crystallization temperature of greater than 125° C. and autogenous pressure to form a pre-crystallized zeolite precursor solution and combined with two or more distinct organosilane mesopore templates to produce a zeolite precursor gel. The zeolite precursor gel is crystallized to produce a crystalline zeolite intermediate and the crystalline zeolite intermediate is calcined to produce the mesoporous zeolite.

15 Claims, 5 Drawing Sheets

(56) References Cited

FOREIGN PATENT DOCUMENTS

| WO | 2014014612 A1 | 1/2014 |
|---|---|---|
| WO | 2015019014 A2 | 2/2015 |
| WO | 2016140315 A1 | 9/2016 |

OTHER PUBLICATIONS

International Search Report and Written Opinion dated Oct. 18, 2019 pertaining to International application No. PCT/US2019/045485 filed Aug. 7, 2019, 19 pgs.

Linares, M. et al. "Effect of hierarchical porosity in Beta zeolites on the Beckmann rearrangement of oximes", Jan. 1, 2017, pp. 181-190, vol. 7, No. 1, Catalysis Science & Technology.

Chu, G. et al. "Preparation of 4-butylaniline-bonded silica gel for the solid-phase extraction of flavone glycosides" Apr. 1, 2015, pp. 1149-1155, vol. 38, No. 7, Journal of Seapration Science.

Serrano, D.P. et al. "Molecular and Meso- and Macroscopic Properties of Hierarchical Nanocrystalline ZSM-5 Zeolite Prepared by Seed Silanization" Feb. 24, 2009, pp. 641-654, vol. 21, No. 4 Chemistry of Materials.

Serrano, D.P. et al. "Narrowing the mesopore size distribution in hierarchical TS-1 zeolite by surfactant-assisted reorganization" Sep. 25, 2013, pp. 71-82, vol. 189, Microporous and Mesoporous Materials.

International Search Report and Written Opinion dated Jun. 18, 2019 pertaining to International application No. PCT/US2019/029649 filed Apr. 29, 2019, 17 pgs.

Garcia-Muñoz, Rafael A. et al., "Remarkable catalytic properties of hierarchical zeolite-Beta in epoxide rearrangement reactions" Catalysis Today, Oct. 23, 2014, pp. 141-152, vol. 243.

Choi, Minkee et al., "Amphiphilic organosilane-directed synthesis of crystalline zeolite with tunable mesoporosity" Nature Materials, Sep. 1, 2006, pp. 718-723, vol. 5, No. 9.

Moller, Karin et al., "Mesoporosity—a new dimension for zeolites" Chemical Society Reviews, Mar. 4, 2013, pp. 3689-3707, vol. 42, No. 9.

Srivastava, Rajendra et al., "Synthesis and applications of ordered and disordered mesoporous zeolites: Present and future prospective" Catalysis Today, Aug. 10, 2017, pp. 172-188, vol. 309.

Li, Bowen et al., "Synthesis and characterization of mesoporous zeolite Beta templated by a novel organosiloxane" Journal of Porous Materials, Mar. 22, 2017, pp. 1673-1678, vol. 24, No. 6.

Serrano et al., "Hierarchical Zeolites with Enhanced Textural and Catalytic Properties Synthesized from Organofunctionlized Seeds", Chem. Mater (2006) pp. 2462-2464.

Serrano et al., "Hierarchical ZSM-5 zeolites synthesized by silanization of protozeolitic units: Mediating the mesoporosity contribution by changing the organosilane type", Catalysis Today (2014) pp. 15-25.

Yan et al., "Silanization-Based Zeolite Crystallization: Participation Degree and Pathway", Chem Eur. J. (2015) pp. 12161-12170.

Office Action dated Sep. 15, 2020 pertaining to U.S. Appl. No. 16/102,027, filed Aug. 13, 2018, 22 pgs.

Notice of Allowance and Fee(s) Due dated Jan. 1, 2021 pertaining to U.S. Appl. No. 16/102,027, filed Aug. 13, 2018, 12 pgs.

\* cited by examiner

METHODS FOR THE SYNTHESIS OF TUNABLE MESOPOROUS ZEOLITES

TECHNICAL FIELD

The present disclosure generally relates to mesoporous zeolites and methods of making mesoporous zeolites. Specifically, the present disclosure relates to mesoporous zeolites and methods of making mesoporous zeolites with a tunable center of pore width distribution.

BACKGROUND

Zeolites are aluminosilicate minerals that are exceedingly useful in a variety of applications, including oil refining, sorption and separation processes, as size selective heterogeneous catalysts, as shape selective heterogeneous catalysts, as encapsulators, as slow-release agents, and for ion-exchange, to name a few. However, the center of pore width distribution of most zeolites often limits the use of zeolites in many applications.

In petroleum processes, upgrading or "cracking" hydrocarbons is often used to refine crude oil and other high molecular weight hydrocarbons into much more valuable, smaller "light" hydrocarbons, such as gasoline and olefinic gases. One of the most common upgrading techniques is catalytic cracking, in which catalysts, most commonly conventional zeolite catalysts, are used to upgrade the hydrocarbons. However, the most efficient or desirable center of pore width distribution of the zeolite for catalytic cracking may be distinct for differing hydrocarbon feeds or desired products. Specifically, the mechanism of zeolite catalysis is believed to be influenced by pore shape and size. As such, zeolite catalysts are selected with consideration of the center of pore width distribution to best upgrade the hydrocarbons.

Previous attempts at providing zeolites with mesoporosity of differing centers of pore width distribution has been made by using a single organosilane template to functionalize the growing seed crystal. Mesopore size is dictated by template structures and as a result each organosilane template results in a single center of pore width distribution. However, the specific centers of pore width distribution are limited to those corresponding to each organosilane template with many centers of pore width distribution unobtainable for lack of a corresponding organosilane template.

SUMMARY

Accordingly, a need exists for methods to produce mesoporous zeolite catalysts with a tunable center of pore width distribution which may be any distinct value along a continuous spectrum of centers of pore width distribution. As such, this disclosure expands the range of mesopore sizes that can be achieved by using a combination of two or more organosilane mesopore templates and varying the ratios of each to achieve a continuous range of mesopore sizes. The methods of the present disclosure unexpectedly allow the center of pore width distribution to be tuned to any of a continuous range of mesopore sizes to achieve maximum catalytic activity.

In accordance with one embodiment of the present disclosure, a method of forming mesoporous zeolites with tunable pore widths is provided. The method includes mixing a silicon-containing material, an aluminum-containing material, and at least a quaternary amine to produce a zeolite precursor solution. The method further includes pre-crystallizing the zeolite precursor solution at a pre-crystallization temperature of greater than 125° C. and autogenous pressure to form a pre-crystallized zeolite precursor solution and combining two or more distinct organosilane mesopore templates with the pre-crystallized zeolite precursor solution to produce a zeolite precursor gel. Additionally, the method includes crystallizing the zeolite precursor gel to produce a crystalline zeolite intermediate and calcining the crystalline zeolite intermediate to produce the mesoporous zeolite.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

This disclosure is directed to various embodiments of method of forming mesoporous zeolites with tunable pore widths, a "zeolite material" or "zeolites" refers to inorganic materials with regular intra-crystalline cavities and channels of molecular dimension. The porous structure of zeolites may render large surface areas and desirable size and shape selectivity, which may be advantageous for catalysis. The mesoporous zeolites described may include aluminosilicates, titanosilicates, or pure silicates. As used throughout this disclosure, "mesopores" or "mesoporous" refers to pores in a structure that have a diameter of greater than 2 nanometers (nm) and less than or equal to 50 nm. Similarly, as used throughout the disclosure, "micropore" or "microporous" refers to pores in a structure that have a diameter of less than or equal to 2 nm and greater than or equal to 0.1 nm.

Figure 1:
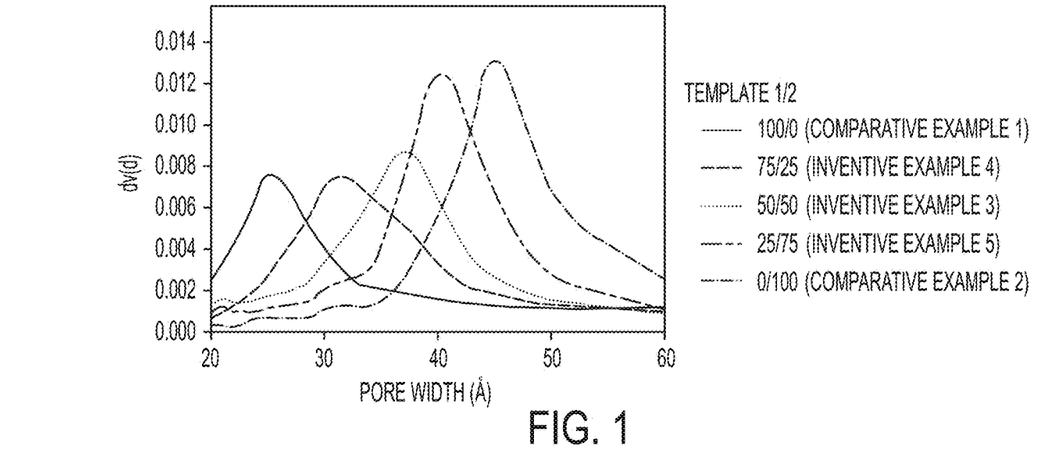
FIG. 1 is a graph of pore width distribution of mesoporous zeolites with various ratios of organosilane templates at 5 mole percent (mol %) total loading, according to one or more embodiments shown and described herein.

For purposes of this disclosure, the term "center of pore width distribution" refers to the pore width value of the pores of the mesoporous zeolite which is most prevalent. With reference to FIG. 1, it may be observed that the frequency of occurrence of individual pore widths in a mesoporous zeolite follow an imperfect Gaussian function. The center of pore width distribution corresponds to the specific pore width having the maximum frequency of occurrence represented by the peak of the plotted individual pore widths.

Embodiments of the present disclosure relate to methods for producing mesoporous zeolites with tunable centers of pore width distribution. The methods include mixing a material containing silicon, a material containing aluminum, and a quaternary amine to create a zeolite precursor solution. The zeolite precursor solution is then pre-crystallized at pre-crystallization temperature of greater than 125° C. and autogenous pressure to form to generate a pre-crystallized zeolite precursor solution. Subsequently, the pre-crystallized zeolite precursor solution is combined with two or more distinct organosilane mesopore templates to form a zeolite precursor gel. In one embodiment, the zeolite precursor gel may contain the two or more distinct organosilane mesopore templates, which may at least partially define the space of the mesopores following their removal. The precursor gel may then be crystallized to produce a crystalline zeolite intermediate. The crystalline zeolite intermediate may be centrifuged, washed, and dried, and finally, the two or more distinct organosilane mesopore templates may be removed by a calcination step to produce the mesoporous zeolite. Without being bound by theory, it is believed that the removal of the two or more distinct organosilane mesopore templates forms at least a portion of mesopores of the mesoporous zeolite, where the mesopores are present in the space or voids once inhabited by the two or more distinct organosilane mesopore templates.

Without being bound by any particular theory, mesoporous zeolites can be synthesized using templates such as organosilane mesopore templates. Mesoporosity may be introduced to zeolites through destructive or constructive methods. Destructive methods include dealumination and desilication, which leach atoms from commercially available materials. However, destructive methods lack control of pore generation size and frequency, may cause amorphization, have limited flexibility in the Si/Al ratio. Constructive methods involve synthesizing zeolites by crystallizing the mineral around a template structure that is burned off during a calcination step, leaving behind pores and channels and are the focus of this disclosure.

The present disclosure relates to use of multiple organosilane mesopore templates to synthesize mesoporous zeolites with tunable mesopore size formation. Specifically, embodiments relate to using two or more distinct organosilane mesopore templates. The methods of this disclosure eliminate the need for a different organosilane mesopore template for any given center of pore width distribution and instead allow the center of pore width distribution to be controlled by judicious selection of a mixture of two or more organosilane mesopore templates. The organosilane mesopore templates may comprise three alkoxyls connecting with an Si atom, as well as one organic moiety bonding with the Si atom through an Si—C bond. Further, the organosilane mesopore templates may have a structure in accordance with R—Si(OR')$_3$, where R is an organic moiety and R' is an alkyl Non-limiting example organosilane mesopore templates and the corresponding organic moiety are provided in Table 1.

TABLE 1

| Example Organosilane Mesopore Templates | |
|---|---|
| Organosilane Mesopore Template | Organic moiety |
| $(CH_3CH_2O)_3Si(CH_2)_7CH_3$ | $(CH_2)_7CH_3$ |
| $(CH_3CH_2O)_3SiCH_2CH=CH_2$ | $CH_2CH=CH_2$ |
| $(CH_3CH_2O)_3SiC_6H_5$ | $C_6H_5$ (benzene) |
| $(CH_3CH_2O)_3SiCH=CH_2$ | $CH=CH_2$ |
| $(CH_3CH_2O)_3SiCH_2CH(CH_3)_2$ | $CH_2CH(CH_3)_2$ |
| $(CH_3CH_2O)_3SiCH_2CH_2CH_3$ | $CH_2CH_2CH_3$ |
| $(CH_3CH_2O)_3SiCH_3$ | $CH_3$ |
| $(CH_3CH_2O)_3SiCH_2CH_2CH_2NH_2$ | $(CH_2)_3NH_2$ |
| $(CH_3O)_3SiCH_2CH_2CH_2NHC_6H_5$ (Template 1) | $(CH_2)_3NHC_6H_5$ |
| $(CH_3O)_3SiCH_2CH_2CH_2OCH_2COHCH_2NHC_6H_4C_6H_5$ (Template 2) | $CH_2CH_2CH_2OCH_2COHCH_2NHC_6H_4C_6H_5$ |
| $(CH_3O)_3SiCH_2CH_2CH_2OCH_2COHCH_2NHC_6H_5$ (Template 3) | $CH_2CH_2CH_2OCH_2COHCH_2NHC_6H_5$ |

TABLE 1-continued

Example Organosilane Mesopore Templates

| Organosilane Mesopore Template | Organic moiety |
|---|---|
| $(CH_3O)_3SiCH_2CH_2CH_2OCH_2COHCH_2NHC_6H_4CH=CHC_6H_5$ (Template 4) | $CH_2CH_2CH_2OCH_2COHCH_2NHC_6H_4CH=CHC_6H_5$ |
| $[(CH_3O)_3Si(CH_2)_3N(CH_3)_2(CH_2)_{17}CH_3]Cl$ | $(CH_2)_3N(CH_3)_2(CH_2)_{17}CH_3$ |
| $(CH_3CH_2O)_2Si(CH_3)_2$ | $(CH_3)_2$ |
| $(CH_3CH_2O)_2Si(CH_3)CH_2CH_2CH_2NH_2$ | $(CH_3)[(CH_2)_3NH_2]$ |
| $(CH_3CH_2O)Si(CH_3)_3$ | $(CH_3)_3$ |
| $(CH_3CH_2O)Si(CH_3)_2CH_2CH_2CH_2NH_2$ | $(CH_3)_2[(CH_2)_3NH_2]$ |

Without being bound by any theory, use of the two or more distinct organosilane mesopore templates may help mitigate the potential issues usually associated with template-driven zeolite synthesis. Utilization of templates may offer improved control over the size and shape of the mesopores formed during the zeolite synthesis when compared to destructive methods of mesopore formation; however, conventionally, there have been several drawbacks to the existing templating procedures. One of the problems is the mesopore size may only be changed by changing the structure of the organosilane template. As a result, a different organosilane template is required for each desired pore width. Additionally, pore widths are limited to those with a corresponding organosilane template associated with the specific static center of pore width distribution desired. As such, it may not be plausible to generate mesoporous zeolite with the desired center of pore width distribution from a single organosilane mesopore template.

Implementation of multiple organosilane mesopore templates in combination, in accordance with embodiments of the present disclosure, allows for the production of mesoporous zeolite with center of pore width distribution of any value intermediate to the center of pore width distribution of each organosilane mesopore template individually. It was unexpectedly discovered that a combination of two or more organosilane mesopore templates does not produce a bimodal distribution of centers of pore width distribution corresponding to the centers of pore width distribution of each organosilane template individually nor a center of pore width distribution corresponding to the largest center of pore width distribution of the individual organosilane mesopore templates. Instead, a combination of two or more organosilane mesopore templates produces a center of pore width distribution at an intermediary size between the centers of pore width distribution when the organosilane mesopore templates are utilized individually. The center of pore width distribution corresponds approximately to a weighted average of the centers of pore width distribution of the individual organosilane mesopore templates based on the molar ratio of the templates used. For example, a 50/50 molar ratio of each template results in a center of pore width distribution of approximately the standard average of the individual centers of pore width distribution. Similarly, a 25/75 molar ratio of templates A and B respectively results in a center of pore width distribution approximately 75% of the way along the continuum between the center of pore width distribution of template A and the center of pore width distribution of template B. This approach allows access to a continuous range of centers of pore width distribution with only two organosilane mesopore templates. This provides the added benefit of only necessarily stocking two distinct organosilane mesopore templates while being able to generate mesoporous zeolites with a vast array of centers of pore width distribution.

In some embodiments, a silicon-containing material, an aluminum-containing material, or both, may be combined with a quaternary amine to form a zeolite precursor solution. The quaternary amine may be utilized as a structure directing agent (SDA) for the fabrication of the zeolite microstructure. Quaternary ammonium is generally depicted in Chemical Structure #1. The quaternary ammonium cations serve as crystallization centers for the forming zeolite subunits, thus creating the regular system of micropores in the zeolite structure.

Chemical Structure #1

As used throughout this disclosure, the encircled plus symbols ("+") show cationic positively charged centers. R groups (including R1, R2, R3, R4) represent chemical constituents. One or more of the various R groups may be structurally identical or may be structurally different from one another.

In Chemical Structure #1, R1, R2, R3, and R4 may include hydrogen atoms or hydrocarbons, such as a hydrocarbon chain. As used throughout this disclosure, a "hydrocarbon" refers to a chemical or chemical moiety containing only hydrogen and carbon atoms. In some other embodiments, R1, R2, R3, and R4 may contain one or more heteroatoms, such as oxygen, sulfur, nitrogen, or phosphorus. For example, the hydrocarbon chain may be branched or unbranched, and may comprise an alkane hydrocarbon chain, an alkene hydrocarbon chain, or an alkyne hydrocarbon chain, including cyclic or aromatic moieties. In some embodiments, one or more of R1, R2, R3, or R4 may represent hydrogen atoms. As used throughout this disclosure, a heteroatom is a non-carbon and non-hydrogen atom. In embodiments, the quaternary ammonium may be present in a cyclic moiety, such as a five atom ring, a six atom ring, or a ring comprising a different number of atoms. For example, in Chemical Structure #1, the R1 and R2 constituents may be part of the same cyclic moiety.

In one or more embodiments, the two cationic moieties may form ionic bonds with anions. Various anionic chemical species are contemplated, including $Cl^-$, $Br^-$, $F^-$, $I^-$, $OH^-$, $½ SO_4^{2-}$, $⅓ PO_4^{3-}$, $½ S^{2-}$, $AlO_2^-$. In some embodiments, an anion with a negative charge of more than 1-, such as 2-, 3-, or 4-, may be utilized, and in those embodiments, a single anion may pair with multiple cations of the structure-directing agent. As used throughout this disclosure, a fraction listed before an anionic composition means that the anion is paired with more than one cation and may, for example, be paired with the number of cations equal to its negative charge.

In one or more embodiments, two cations of a monomer may be separated from one another by a hydrocarbon chain. The hydrocarbon chain may be branched or unbranched, and may comprise an alkane hydrocarbon chain, an alkene hydrocarbon chain, or an alkyne hydrocarbon chain, including cyclic or aromatic moieties. In one embodiment, the length of the hydrocarbon chain (measured as the number of carbons in the chain directly connecting the two cations) may be from 1 to 10,000 carbon atoms, such 1 to 20 carbon atom alkane chains.

In some embodiments, the quaternary amine may comprise a tetraalkyl ammonium hydroxide, such as tetraethylammonium hydroxide (TEAOH). In other embodiments, the quaternary amine may comprise propyltrimethylammonium hydroxide, tetramethylammonium hydroxide, tetrapropylammonium hydroxide, octyltrimethylammonium hydroxide, dodecyltrimethylammonium hydroxide, cetyltrimethylammonium hydroxide, or combinations of these.

In one or more embodiments, the silicon-containing materials comprise silica ($SiO_2$), sodium silicate, tetramethylsiloxane, tetraethylsiloxane, silicate salt, silicon alkoxide, or combinations thereof.

In one or more embodiments, the aluminum-containing materials comprise alumina ($Al_2O_3$), aluminum nitrate, aluminum sulfate, aluminum alkoxide, other aluminum salts, or combinations thereof.

As previously indicated, the zeolite precursor solution is pre-crystallized to generate a pre-crystallized zeolite precursor solution. Pre-crystallization represents the formation of an amorphous phase in pseudo-steady-state where solid and solution phases approach equilibrium and silicate and aluminosilicate anion distributions are established. In one or more embodiments, the zeolite precursor solution is pre-crystallized in a polytetrafluoroethylene (PTFE) (commonly known as Teflon™) lined stainless steel autoclave at 135° C. and autogenous pressure for 48 hours. In various embodiments, the pre-crystallization is completed at a pre-crystallization temperature of greater than 105° C., greater than 115° C., greater than, or greater than 125° C. including in the range of 115° C. to 145° C., 125° C. to 135° C., and 135° C. to 145° C. Further, in various embodiments, the zeolite precursor solution is kept in the PTFE lined stainless steel autoclave at the pre-crystallization temperature and autogenous pressure for 24 hours, 30 hours, 36 hours, 42 hours, 54 hours, 60 hours, or 72 hours including 24 hours to 72 hours, 30 hours to 48 hours, 36 hours to 54 hours, and 42 hours to 72 hours.

In embodiments, the pre-crystallized zeolite precursor solution may be combined with two or more distinct organosilane mesopore templates to form the zeolite precursor gel. In one or more embodiments, a quaternary amine may additionally be added to the pre-crystallized zeolite precursor solution to generate the zeolite precursor gel. The quaternary amine may be the same as the quaternary amine utilized in the initial combination of the silicon-containing material, the aluminum-containing material, or both, with the quaternary amine to form the zeolite precursor solution. In one or more specific embodiments, the quaternary amine is TEAOH.

The loading of the organosilane mesopore templates determines the total pore volume of the final mesoporous zeolite. An increase in organosilane mesopore template loading corresponds to an increase in the total pore volume of the mesoporous zeolite. In various embodiments, the total loading of the organosilane mesopore template as a mole percent (mol %) with respect to the silicon-containing material loading may be 0.5 mol %, 1 mol %, 2.5 mol %, 5 mol %, 10 mol %, 15 mol %, 20 mol % or 25 mol % including all the ranges subsumed therein.

The precursor gel may then be crystallized to produce the crystalline zeolite intermediate. In one or more embodiments, the precursor gel is crystallized in a PTFE lined stainless steel autoclave at 170° C. and autogenous pressure for 7 days. In various embodiments, the crystallization is completed at a crystallization temperature greater than 140° C., greater than 150° C., greater than, or greater than 160° C. including in the range of 140° C. to 170° C., 150° C. to 160° C., and 150° C. to 170° C. Further, in various embodiments, the zeolite precursor solution is kept in the PTFE lined stainless steel autoclave at the crystallization temperature and autogenous pressure for 3 days, 5 days, 10 days, or 12 days including 3 days to 12 days, 5 days to 7 days, 7 days to 12 days, and 3 days to 10 days.

In some embodiments, the crystalline zeolite intermediate may be calcined. Calcining may occur in the presence of air at temperatures above 500° C., above 550° C., above 600° C., or even above 750° C. The calcining step may remove the two or more distinct organosilane mesopore templates and structure-directing agents, for instance, by burning them off. The elevated temperature to calcine the crystalline zeolite intermediate may be maintained for 3 hours, 5 hours, 6 hours, or 8 hours including 3 hours to 8 hours, 5 hours to 8 hours, and 6 hours to 8 hours. Upon calcination, the organosilane mesopore templates may be removed to give rise to the mesopore-sized voids in the produced mesoporous zeolite. Various heater units are envisioned as suitable, including ovens and autoclaves, or use of any other known techniques in the industry.

In embodiments, the mesoporous zeolites fabricated in accordance with this disclosure be characterized as exhibiting a Y or faujasite framework, an MFI (mordenite framework inverted) framework, or a BEA (Beta polymorphs A and B) framework. For example, the mesoporous zeolites described may be characterized as ZSM-5 (that is, having an aluminosilicate MFI framework type), as TS-1 (that is, having a titanosilicate MFI framework type), or as silicalite-I (that is, having a pure silicate MFI framework type) zeolite. In other embodiments, the mesoporous zeolites described may be characterized as Beta (that is, having an aluminosilicate BEA framework type) or faujasite (having a Y-type framework). In some particular embodiments, the mesoporous zeolites fabricated by the methods of the present disclosure may be Beta framework zeolites.

Without being bound by any particular theory, the materials of the at least one silicon-containing material, aluminum-containing material, or both, may determine the material composition of the mesoporous zeolite produced, which may be an aluminosilicate, a titanosilicate, or a pure silicate zeolite. In some embodiments, the mesoporous zeolite of the present disclosure may be an aluminosilicate mesoporous zeolite with a molar ratio of Si/Al of greater than or equal to 5, greater than or equal to 10, greater than or equal to 30, or greater than or equal to 50. In some embodiments, the mesoporous zeolite of the present disclosure may be an aluminosilicate mesoporous zeolite with a molar ratio of Si/Al of greater than or equal to 5 and less than 100, greater than or equal to 10 and less than 100, greater than or equal to 25 and less than 100, greater than or equal to 30 and less than 100, greater than or equal to 20 and less than 80, greater than or equal to 40 and less than 80, greater than or equal to 25 and less than 75, or even greater than or equal to 35 and less than 95. In other embodiments, the mesoporous zeolite of the present disclosure may be a pure silicate zeolite, and may have a negligible amount or no amount of aluminum is present, with a Si/Al molar ratio that theoretically approaches infinity. As used herein a "pure silicate" refers to a material comprising at least about 99.9 weight percent (wt. %) of silicon and oxygen atoms. A pure silica mesoporous zeolite may be formed by utilizing only silicon-containing materials and no aluminum.

The mesoporous zeolites of the present disclosure may comprise mesopores and micropores. The mesoporous zeolites may have surface areas and pore volumes greater than that of conventionally produced zeolites. In this disclosure, a "conventional zeolite" or "conventionally produced zeolite" refers to a zeolite that does not substantially comprise mesopores (for example, less than 0.5% of the zeolite pore volume is characterized as mesopores). Without being bound by any particular theory, it is believed that the quaternary amines utilized by the present disclosure may aid in forming the micropores, whereas the mesopores may be formed from the voids created during calcination of the organosilane mesopore templates.

The mesoporous zeolites described in the present disclosure may have enhanced catalytic activity. The tuning of the center of pore width distribution of the mesopores allows for selection of mesopore sizing which is optimized for specific catalytic reactions. Specifically, the tuned mesopore sizing may allow for greater catalytic functionality because more catalytically active sites are available for contact with the reactant in a catalytic reaction. Similarly, the mesopores may allow for better access to microporous catalytic sites on the mesoporous zeolite.

The mesoporous zeolites described may form as particles that may be generally spherical in shape or irregular globular shaped (that is, non-spherical). In embodiments, the particles have a "particle size" measured as the greatest distance between two points located on a single zeolite particle. For example, the particle size of a spherical particle would be its diameter. In other shapes, the particle size is measured as the distance between the two most distant points of the same particle, where these points may lie on outer surfaces of the particle. The particles may have a particle size from 25 nm to 500 nm, from 50 nm to 400 nm, from 100 nm to 300 nm, or less than 900 nm, less than 800 nm, less than 700 nm, less than 600 nm, less than 500 nm, less than 400 nm, less than 300 nm, or less than 250 nm. Particle sizes may be determined by examination under a TEM or SEM microscope.

Using physisorption, surface area, pore size, and pore volume may be calculated. Physisorption measures gas uptake to calculate the surface area, pore size, and pore volume. Output from the physisorption isotherm is in the form of a graph representing cumulative pore volume with respect to pore size. The first derivative of such graph provides differential pore volume (dV(d)) and the distribution of pore sizes.

EXAMPLES

Using the methods of the present disclosure, mesoporous zeolites were produced to exemplify the attributes previously described. Five example methods were undertaken in accordance with the present disclosure in which the ratio of the two or more organosilane mesopore templates was varied. Another three example methods were conducted with a different pairing of organosilane mesopore templates utilized. Each of the example methods were also undertaken with the total loading of organosilane mesopore template varied.

Example Preparation Protocol

Each example zeolite was a zeolite beta prepared with the following molar composition: 1 $Al_2O_3$:60 $SiO_2$:31 TEAOH: 1000 $H_2O$. The initial formulation was prepared by combining fumed silica (2.955 g), aluminum powder (0.044 g), tetraethylammonium hydroxide (TEAOH) (10.693 g—35% aqueous solution), and distilled water (7.742 g). The initial formulation mixture was pre-crystallized in a polytetrafluoroethylene (PTFE) (commonly known as Teflon™) lined stainless steel autoclave at 135° C. and autogenous pressure for 48 hours. The resulting gel was mixed with additional aqueous TEAOH (27.86 g—13% aqueous solution) and each organosilane mesopore template at the provided loading for each example and crystallized in a PTFE-lined stainless steel autoclave at 170° C. and autogenous pressure for 7 days. The mole % (mol %) for each loading is based on the silicon content of the gel. The resulting zeolite products were then separated by centrifugation, washed multiple times with water, dried, and then calcined at 550° C. for 6 hours.

An initial set of Comparative Example and Inventive Examples were prepared using Template 1 and Template 2. Template 1 is an organosilane template having the chemical structure illustrated infra.

Template 1

Template 2 is an organosilane template having the chemical structure illustrated infra.

Template 2

Comparative Example 1—5 Mol % Template 1

Comparative Example 1 was prepared in accordance with the example preparation protocol provided supra with the organosilane mesopore template addition comprising loading with 5 mol % of Template 1.

Comparative Example 2—5 Mol % Template 2

Comparative Example 2 was prepared in accordance with the example preparation protocol provided supra with the organosilane mesopore template addition comprising loading with 5 mol % of Template 2.

Inventive Example 3—2.5 Mol % Template 1+2.5 Mol % Template 2

Inventive Example 3 was prepared in accordance with the example preparation protocol provided supra with the organosilane mesopore template addition comprising loading with 2.5 mol % of Template 1 and 2.5 mol % of Template 2.

Inventive Example 4—3.75 Mol % Template 1+1.25 Mol % Template 2

Inventive Example 4 was prepared in accordance with the example preparation protocol provided supra with the organosilane mesopore template addition comprising loading with 3.75 mol % of Template 1 and 1.25 mol % of Template 2.

Inventive Example 5—1.25 Mol % Template 1+3.75 Mol % Template 2

Inventive Example 5 was prepared in accordance with the example preparation protocol provided supra with the organosilane mesopore template addition comprising loading with 1.25 mol % of Template 1 and 3.75 mol % of Template 2.

With reference to FIG. 1, the distribution of pore widths for Comparative Examples 1-2 and Inventive Examples 3-5 demonstrates the shift in center of pore width distribution as the ratio of Template 1 and Template 2 is adjusted. Comparative Example 1 (100% Template 1) is indicated as having a center of pore width distribution of approximately 25 angstrom (Å) and Comparative Example 2 (100% Template 2) is indicated as having a center of pore width distribution of approximately 45 Å. The Inventive Examples comprising a mixture of Template 1 and Template 2 are indicated as having intermediate centers of pore width distribution of approximately 31 Å, 37 Å, and 40 Å for mole percentages of Template A of 25 mol % (Inventive Example 4), 50 mol % (Inventive Example 3), and 75 mol % (Inventive Example 5) respectively. It may be appreciated from a review of FIG. 1 that the center of pore width distribution may be tuned by changing the ratio of the two or more organosilane templates used for the zeolite synthesis. It may be further appreciated that a continuous range of centers of pore width distribution are achievable by varying the ratio of organosilate templates.

Figure 2A:
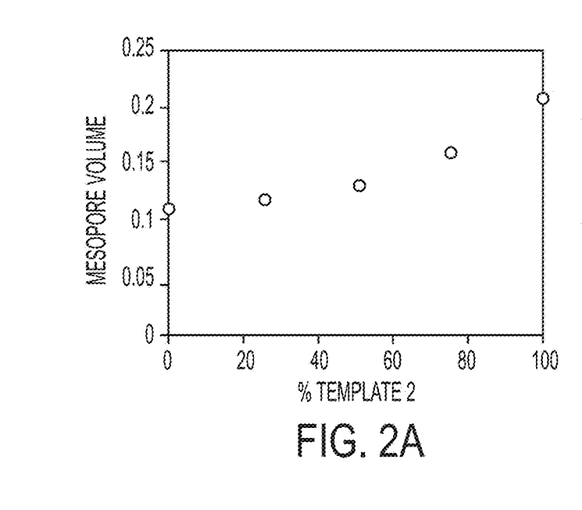
FIG. 2A is a graph of mesopore volumes of mesoporous zeolites with various ratios of organosilane templates at 5 mol % total loading, according to one or more embodiments shown and described herein.
Figure 2B:
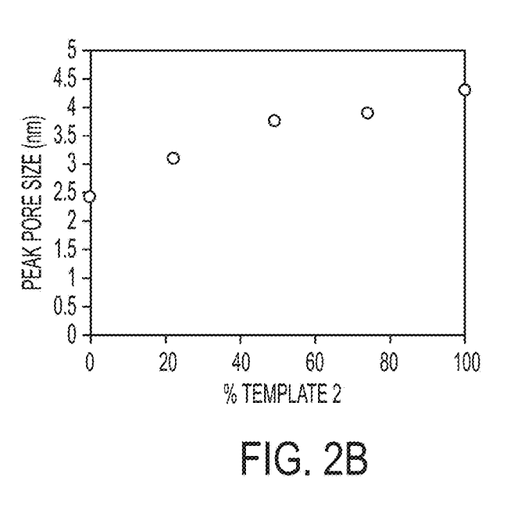
FIG. 2B is a graph of center of pore width distribution of mesoporous zeolites with various ratios of organosilane templates at 5 mol % total loading, according to one or more embodiments shown and described herein.

Center of pore width distribution and mesopore volumes respond in a linear fashion to changes in the loading percentage of each organosilane template. With reference to FIG. 2A the linear response of mesopore volumes as the ratio of organolane templates in the zeolite is transitioned from 100% Template 1 to 100% Template 2 is demonstrated. Similarly, with reference to FIG. 2B the linear response of center of pore width distribution as the ratio of organolane templates in the zeolite is transitioned from 100% Template 1 to 100% Template 2 is also demonstrated. The linear nature of the response of center of pore width distribution and mesopore volumes to the loading ratio of the organosilane templates indicates the methods of this disclosure provide a predictable and controlled system that can be used to create mesoporous zeolites with precisely defined features.

As previously indicated, the organosilane templates which may be used in accordance to this disclosure include any small molecule or polymeric organosilane that is capable of generating mesoporosity in a zeolite species. The generality of the methods and techniques of this disclosure are demonstrated with a second set of distinct organosilane templates which also provide centers of pore width distribution at an intermediate point between the center of pore width distribution of each individual organosilane.

An additional set of Comparative Example and Inventive Examples were prepared using Template 3 and Template 4. Template 3 is an organosilane template having the chemical structure illustrated infra.

Template 3

Template 4 is an organosilane template having the chemical structure illustrated infra.

Template 4

Comparative Example 6—5 Mol % Template 3

Comparative Example 6 was prepared in accordance with the example preparation protocol provided supra with the organosilane mesopore template addition comprising loading with 5 mol % of Template 3.

Comparative Example 7—5 Mol % Template 4

Comparative Example 7 was prepared in accordance with the example preparation protocol provided supra with the organosilane mesopore template addition comprising loading with 5 mol % of Template 4.

Inventive Example 8—2.5 Mol % Template 3+2.5 Mol % Template 4

Inventive Example 8 was prepared in accordance with the example preparation protocol provided supra with the organosilane mesopore template addition comprising loading with 2.5 mol % of Template 3 and 2.5 mol % of Template 4.

The properties of Examples 1-8 are listed in Table 2. As previously described, the mesoporous zeolites produced by the methods of the present disclosure exhibit centers of pore width distribution intermediate the centers of pore width distribution formed with each of the two distinct organosilane mesopore templates individually. Using Template 1 and Template 2, the centers of pore width distribution of Inventive Example 4 (75/25), Inventive Example 3 (50/50), and Inventive Example, 5 (25/75) exhibit centers of pore width distribution between the centers of pore width distribution of Comparative Example 1 (100/0) and Comparative Example 2 (0/100). Specifically, Inventive Example 3 (50/50) exhibits a center of pore width distribution approximately the average of the centers of pore width distribution of Comparative Example 1 (100/0) and Comparative Example 2 (0/100) individually. The centers of pore width distribution of Inventive Example 4 (75/25) and Inventive Example 5 (25/75) also demonstrate approximately the weighted average of the centers of pore width distribution of Comparative Example 1 (100/0) and Comparative Example 2 (0/100) individually.

The generality of the methods and techniques of this disclosure are demonstrated with the second set of distinct organosilane templates (Template 3 and Template 4) which also provide centers of pore width distribution at an intermediate point between the center of pore width distribution of Template 3 and Template 4 individually. Specifically, using Template 3 and Template 4, Comparative Example 6 (100/0), Comparative Example 7 (0/100), and Inventive Example 8 (50/50) are provided with the center of pore width distribution of Inventive Example 8 falling at an intermediate point between Comparative Example 6 and Comparative Example 7.

Figure 3:
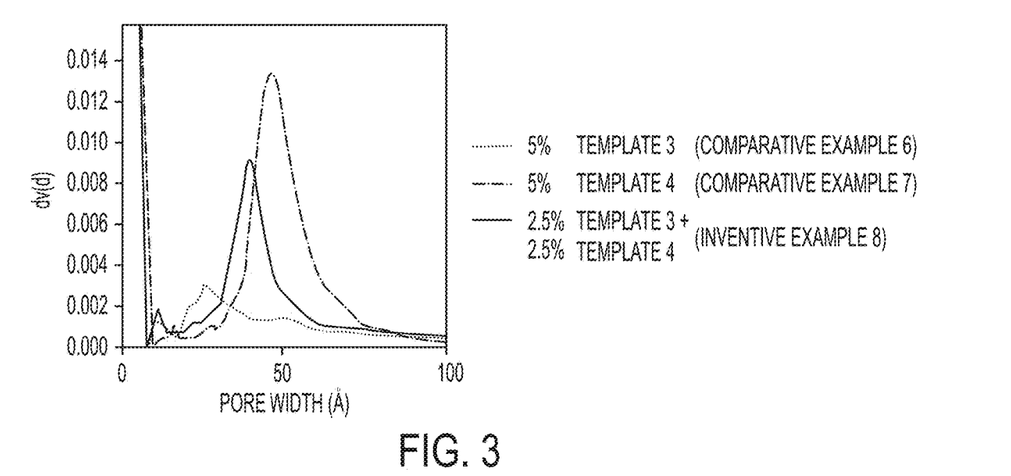
FIG. 3 is a graph of pore width distribution of mesoporous zeolites with various ratios of organosilane templates at 5 mol % total loading, according to one or more embodiments shown and described herein.

With reference to FIG. 3, the distribution of pore widths for Comparative Examples 6-7 and Inventive Example 8 demonstrates the universality of the shift in center of pore width distribution as the ratio of organosilane templates is adjusted. Comparative Example 6 (100% Template 3) is indicated as having a center of pore width distribution of approximately 31 Å and Comparative Example 7 (100% Template 4) is indicated as having a center of pore width distribution of approximately 49 Å. Inventive Example 8 (50/50) comprising a mixture of Template 3 and Template 4 is indicated as having an intermediate center of pore width distribution of approximately 43 Å.

TABLE 2

Examples 1-8 with Varying Organosilicate Template Loadings

| Template | Molar Ratio | BET Surface Area (m$^2$/g) | Center of Pore Width Distribution (Å) | DFT Micropore Volume (cm$^3$/g) | DFT Total Pore Volume (cm$^3$/g) | Mesopore Volume (cm$^3$/g) |
|---|---|---|---|---|---|---|
| Template 1/2 | Comparative Example 1 100/0 | 511.8 | 25 | 0.157 | 0.392 | 0.235 |
| | Inventive Example 4 75/25 | 465.2 | 31 | 0.155 | 0.428 | 0.273 |
| | Inventive Example 3 50/50 | 428.7 | 37 | 0.14 | 0.381 | 0.241 |
| | Inventive Example 5 25/75 | 407.1 | 40 | 0.134 | 0.346 | 0.212 |
| | Comparative Example 2 0/100 | 437.8 | 45 | 0.149 | 0.412 | 0.263 |
| Template 3/4 | Comparative Example 6 100/0 | 416.3 | 31 | 0.163 | 0.357 | 0.194 |
| | Inventive Example 8 50/50 | 488 | 43 | 0.175 | 0.466 | 0.291 |
| | Comparative Example 7 0/100 | 395.7 | 49 | 0.107 | 0.413 | 0.306 |

The pore volumes indicated in Table 2 were calculated using the density functional theory (DFT) method. The DFT method is a modeling technique considered to be one of the most reliable methods to calculate pore sizes and volumes for porous materials. Additionally, the total pore volume was determined for pores in the range of 0 to 40 nanometers (nm). An upper limit of 40 nm excludes pores of such substantial size that they no longer may be considered a pore and functionally become a cavity in the mesoporous zeolite. Determination of mesopore pore volume was achieved by subtracting the micropore volume calculated in accordance with the DFT method from the total pore volume also calculated in accordance with the DFT method. Example characterization of porous materials using DFT methods is detailed in J. Landers, G. Y. Gor, A. V. Neimark, Colloids and Surfaces A: Physicochem. Eng. Aspects 437 (2013) 3-32.

The inventive examples characterized in Table 2 provide a demonstration of the ability to generate mesoporous zeolites with a center of pore width distribution tunable to fall at any point along the spectrum of centers of pore width distribution generated with each of the two distinct organosilane mesopore templates individually by varying the ratio of the two distinct organosilane mesopore templates.

The total loading of organosilane mesopore templates was adjusted to verify that the variation in center of pore width distribution seen for the template mixtures in Inventive Examples 3, 4, 5, and 8 was the result of the mixture of the two distinct organosilane mesopore templates and not simply an effect of changing the organosilane mesopore template loading. As such, examples with total organosilane mesopore template loadings of 2.5 mol % and 10 mol % were generated as comparisons to the total organosilane mesopore template loading of 5.0 mol % of Examples 1-8.

Comparative Example 9—2.5 Mol % Template 1

Comparative Example 9 was prepared in accordance with the example preparation protocol provided supra with the organosilane mesopore template addition comprising loading with 2.5 mol % of Template 1.

Comparative Example 10—10 Mol % Template 1

Comparative Example 10 was prepared in accordance with the example preparation protocol provided supra with the organosilane mesopore template addition comprising loading with 10 mol % of Template 1.

Comparative Example 11—2.5 Mol % Template 2

Comparative Example 10 was prepared in accordance with the example preparation protocol provided supra with the organosilane mesopore template addition comprising loading with 2.5 mol % of Template 2.

Comparative Example 12—10 Mol % Template 2

Comparative Example 12 was prepared in accordance with the example preparation protocol provided supra with the organosilane mesopore template addition comprising loading with 10 mol % of Template 2.

Inventive Example 13—7.5 Mol % Template 1+2.5 Mol % Template 2

Inventive Example 13 was prepared in accordance with the example preparation protocol provided supra with the organosilane mesopore template addition comprising loading with 7.5 mol % of Template 1 and 2.5 mol % of Template 2.

Inventive Example 14—5 Mol % Template 1+5 Mol % Template 2

Inventive Example 14 was prepared in accordance with the example preparation protocol provided supra with the organosilane mesopore template addition comprising loading with 5 mol % of Template 1 and 5 mol % of Template 2.

Inventive Example 15—2.5 Mol % Template 1+7.5 Mol % Template 2

Inventive Example 15 was prepared in accordance with the example preparation protocol provided supra with the organosilane mesopore template addition comprising loading with 2.5 mol % of Template 1 and 7.5 mol % of Template 2.

Figure 4:
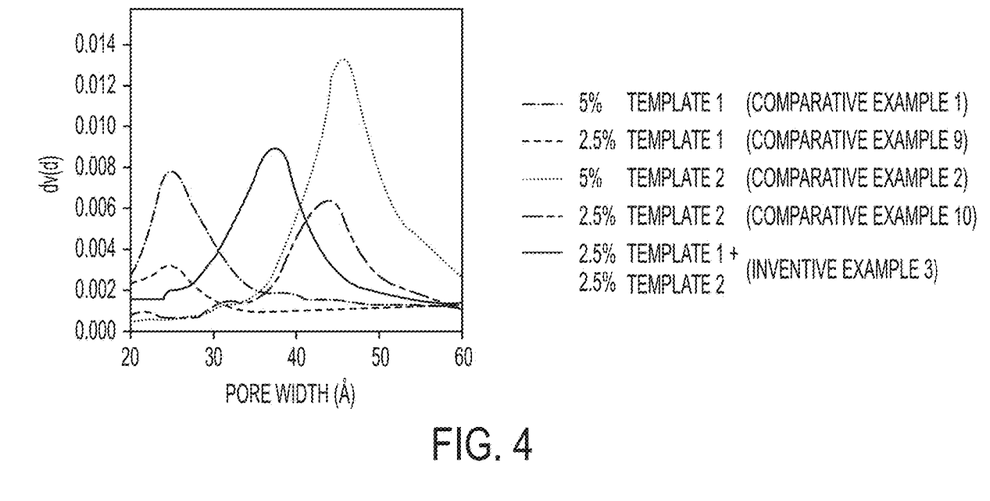
FIG. 4 is a graph of pore width distribution of mesoporous zeolites with various ratios of organosilane templates and varied total loading of 5 mol % and 2.5 mol %, according to one or more embodiments shown and described herein.

With reference to FIG. 4, it is demonstrated that the center of pore width distribution for each of Template 1 and Template 2 remains substantially unchanged when loading of each template is reduced from 5.0 mol % as in Comparative Example 1 and Comparative Example 2 to 2.5 mol % as in Comparative Example 9 and Comparative Example 10 respectively. Specifically, it may be visualized that the total volume of pores is reduced between Comparative Example 1 and Comparative Example 9 when the loading of Template 1 is changed from 5 mol % to 2.5 mol % while maintaining a center of pore width distribution of approximately 25 Å. Similarly, it may be visualized that the total volume of pores is reduced between Comparative Example 2 and Comparative Example 10 when the loading of Template 2 is changed from 5 mol % to 2.5 mol % while maintaining a center of pore width distribution of approximately 45 Å.

Figure 5A:
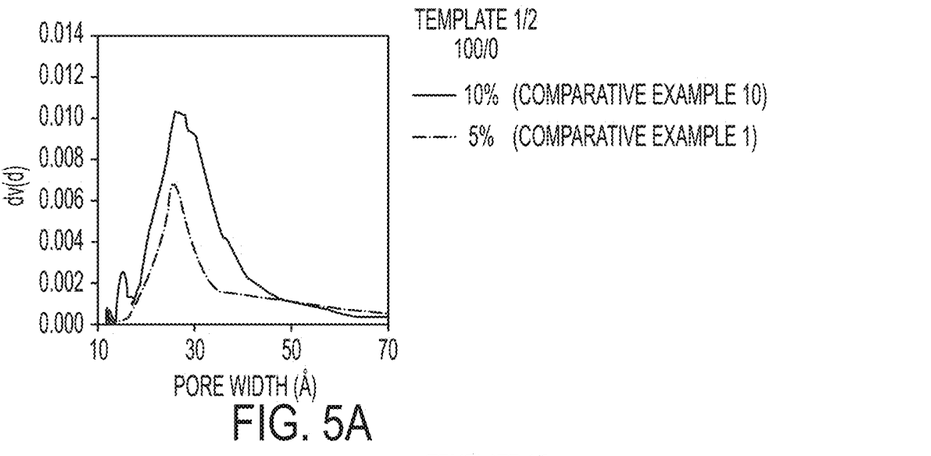
FIG. 5A is a graph of pore width distribution of mesoporous zeolite formed with 100% Template 1 at 5 mol % and 10 mol % loading.
Figure 5B:
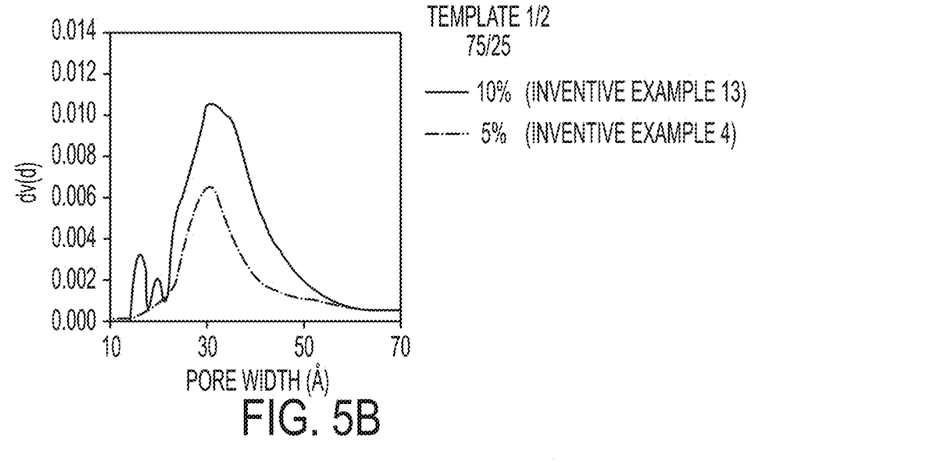
FIG. 5B is a graph of pore width distribution of mesoporous zeolite formed with Templates 1 and 2 at a molar ratio of 75/25 at 5 mol % and 10 mol % total loading, according to one or more embodiments shown and described herein.
Figure 5C:
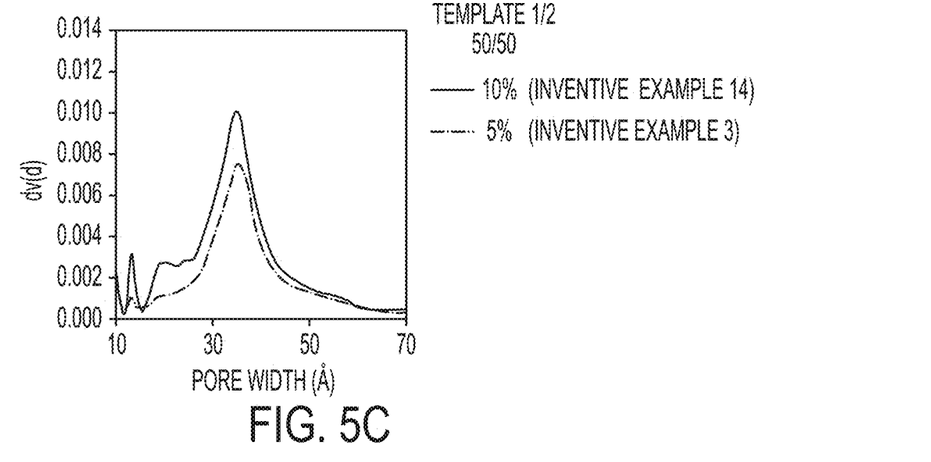
FIG. 5C is a graph of pore width distribution of mesoporous zeolite formed with Templates 1 and 2 at a molar ratio of 50/50 at 5 mol % and 10 mol % total loading, according to one or more embodiments shown and described herein.
Figure 5D:
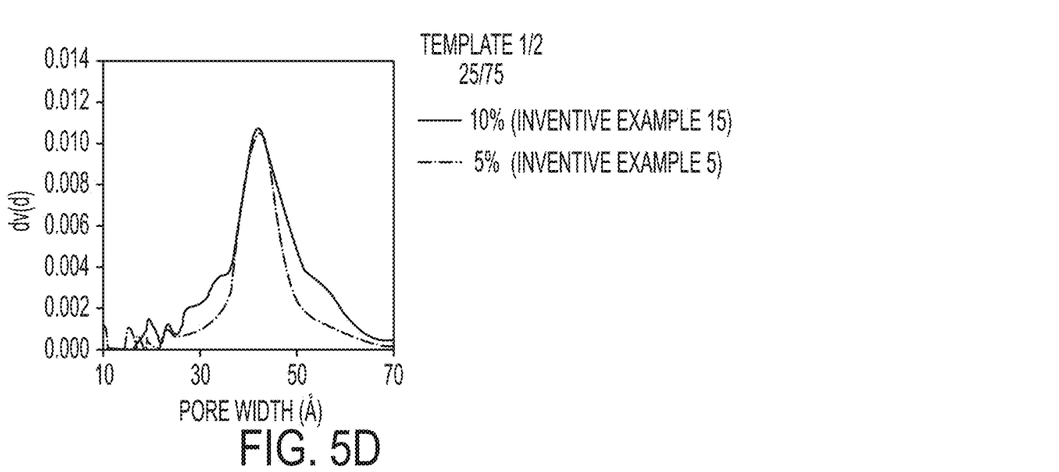
FIG. 5D is a graph of pore width distribution of mesoporous zeolite formed with Templates 1 and 2 at a molar ratio of 25/75 at 5 mol % and 10 mol % total loading, according to one or more embodiments shown and described herein.
Figure 5E:
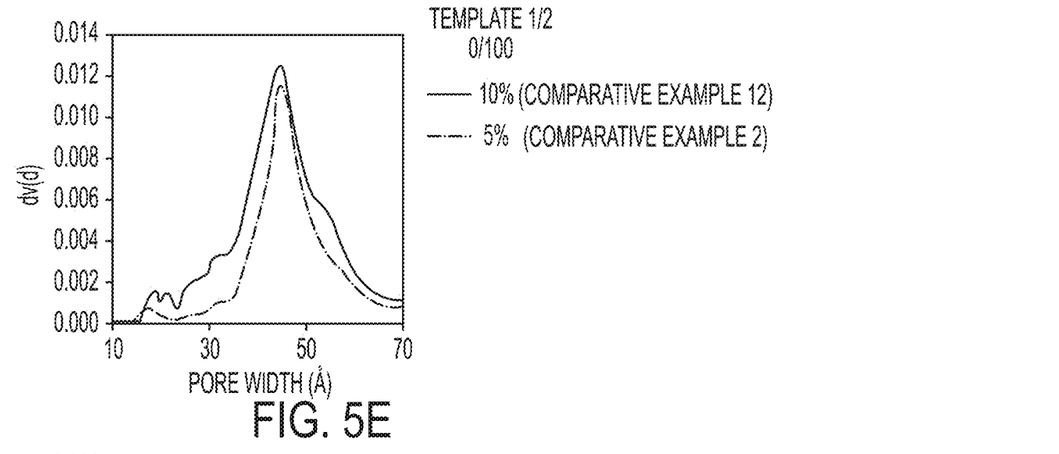
FIG. 5E is a graph of pore width distribution of mesoporous zeolite formed with 100% Template 2 at 5 mol % and 10 mol % loading.

With reference to FIGS. 5A-5E, it is demonstrated that an increase in total loading of the organosilane mesopore templates results in an increase on the total pore volume of the resulting zeolite while maintaining the same center of pore width distribution for a given organosilane mesopore template ratio. Specifically, with reference to FIG. 5A, an increase in loading of Template 1 from 5 mol % to 10 mol % as demonstrated with Comparative Examples 1 and 10 respectively maintains centers of pore width distribution of approximately 25 Å with an increase in total pore volume. Similarly, with reference to FIG. 5E, an increase in loading of Template 2 from 5 mol % to 10 mol % as demonstrated with Comparative Examples 2 and 12 respectively maintains centers of pore width distribution of approximately 45 Å with an increase in total pore volume. The same trend of maintaining center of pore width distribution while increasing total pore volume holds true for mixtures of Template 1 and Template 2. As shown in FIG. 5B, Inventive Example 13 demonstrates retention of the center of pore width distribution of approximately 31 Å while also demonstrating an increase in total pore volume when compared to Inventive Example 4. As shown in FIG. 5C, Inventive Example 14 demonstrates retention of the center of pore width distribution of approximately 37 Å while also demonstrating an increase in total pore volume when compared to Inventive Example 3. As shown in FIG. 5D, Inventive Example 15 demonstrates retention of the center of pore width distribution of approximately 40 Å while also demonstrating an increase in total pore volume when compared to Inventive Example 5.

Figure 5F:
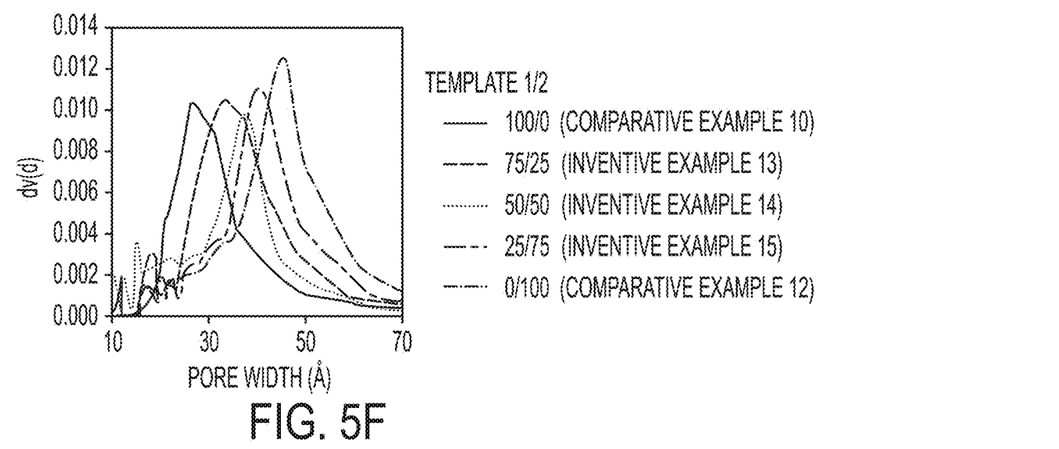
FIG. 5F is a graph of pore width distribution of mesoporous zeolites with various ratios of organosilane templates at 10 mol % total loading, according to one or more embodiments shown and described herein.

Additionally, with reference to FIG. 5F, it is demonstrated than an increase in total loading of the organosilane mesopore templates from 5 mol % to 10 mol % still results in a zeolite with tunable center of pore width distribution by varying the ratio of the organosilane mesopore templates. Specifically, Comparative Example 10 and Comparative Example 12 provide centers of pore width distribution of approximately 25 Å and 45 Å respectively with Inventive Examples 13, 14, and 15 providing centers of pore width distribution along the continuum between 25 Å and 45 Å as the mol % of Template 2 is increased relative to Template 1.

Figure 6:
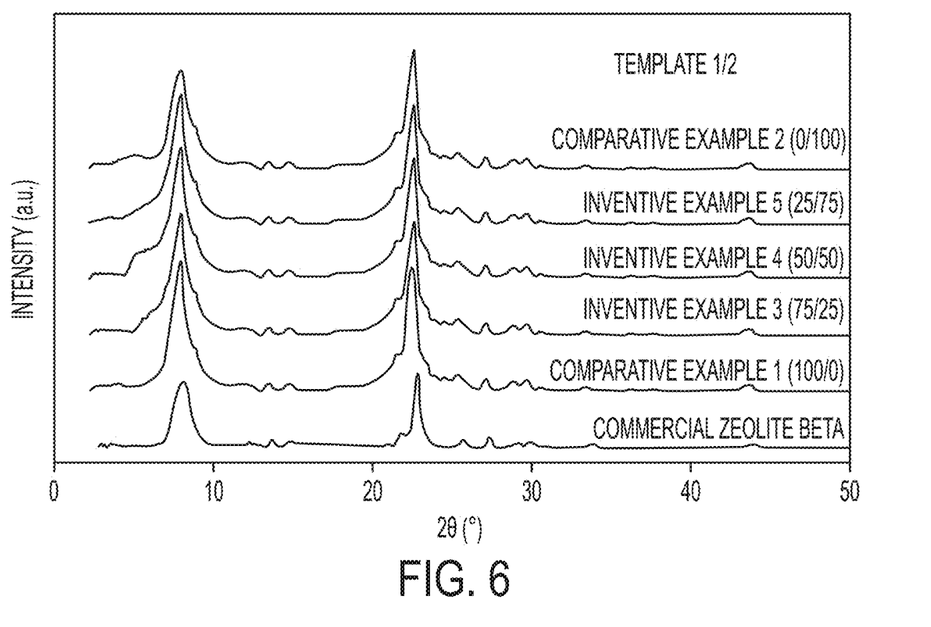
FIG. 6 is an X-ray diffraction graph for commercial zeolite beta and mesoporous zeolites with various ratios of organosilane templates and varied total loading of 5 mol % and 2.5 mol %, according to one or more embodiments shown and described herein.

The zeolites of for each of Examples 1-15 were also verified as zeolite beta with X-ray diffraction spectra analysis. Specifically, the X-ray diffraction spectra for each of Example 1-15 showed the characteristic zeolite beta peaks. With reference to FIG. 6, the X-ray diffraction spectra are provided for Examples 1-5 along with commercial zeolite Beta. Characteristic peaks of zeolite Beta are shown at approximately 2θ of 7 and 22 degrees as well as multiple less intense peaks at various other angles. As such, it is demonstrated that variation or changes in the organosilane mesopore templates does not affect the zeolite beta nature of the resulting zeolite.

It should be understood that the various aspects of the method of method of forming mesoporous zeolites with tunable pore widths are described and such aspects may be utilized in conjunction with various other aspects.

In a first aspect, a method of forming mesoporous zeolites with tunable pore widths is provided. The method includes mixing a silicon-containing material, an aluminum-containing material, and at least a quaternary amine to produce a zeolite precursor solution; pre-crystallizing the zeolite precursor solution at a pre-crystallization temperature of greater than 125° C. and autogenous pressure to form a pre-crystallized zeolite precursor solution; combining two or more distinct organosilane mesopore templates with the pre-crystallized zeolite precursor solution to produce a zeolite precursor gel; crystallizing the zeolite precursor gel to produce a crystalline zeolite intermediate; and calcining the crystalline zeolite intermediate to produce the mesoporous zeolite.

A second aspect may include the first aspect wherein the crystalline zeolite intermediate is calcined by exposure to a temperature of at least 500° C.

A third aspect may include the first or second aspect, wherein the silicon-containing material comprises $SiO_2$, sodium silicate, tetramethylsiloxane, tetraethylsiloxane, silicon salt, silicon alkoxide, or combinations thereof.

A fourth aspect may include any of the first to third aspects, wherein the aluminum-containing material comprises aluminum nitrate, aluminum sulfate, aluminum alkoxide, other aluminum salts, or combinations thereof.

A fifth aspect may include any of the first to fourth aspects, wherein the mesoporous zeolite comprises an MFI framework type, a FAU framework type, an MOR framework type, or a BEA framework type.

A sixth aspect may include any of the first to fourth aspects, wherein the mesoporous zeolite comprises a Beta zeolite.

A seventh aspect may include any of the first to sixth aspects, wherein the quaternary amine is additionally combined with the pre-crystallized zeolite precursor solution along with the two or more distinct organosilane mesopore templates.

An eighth aspect may include any of the first to seventh aspects, wherein the quaternary amine comprises tetraethylammonium hydroxide, tetraethylammonium alkoxide, tetrapropylammonium alkoxide, other alkaline materials comprising ammonium, or combinations thereof.

A ninth aspect may include any of the first to seventh aspects, wherein the quaternary amine comprises tetraethylammonium hydroxide.

A tenth aspect may include any of the first to ninth aspects, wherein the two or more distinct organosilane mesopore templates have a total loading of 0.5 mol % to 25 mol % with respect to the silicon-containing material loading.

An eleventh aspect may include any of the first to ninth aspects, wherein the two or more distinct organosilane mesopore templates have a total loading of 2.5 mol % to 10 mol % with respect to the silicon-containing material loading.

A twelfth aspect may include any of the first to eleventh aspects, wherein two distinct organosilane mesopore templates at a ratio of 95:5 to 5:95 are combined with the pre-crystallized precursor solution.

A thirteenth aspect may include any of the first to twelfth aspects, wherein the two or more distinct organosilane mesopore templates comprise compounds in accordance with R—Si(OR')$_3$, where R is an organic moiety and R' is an alkyl.

A fourteenth aspect may include any of the first to thirteenth aspects, wherein the two or more distinct organosilane mesopore templates comprises one or more of the following templates: Template 1, Template 2, Template 3, and Template 4.

A fifteenth aspect may include any of the first to thirteenth aspects, wherein the two or more distinct organosilane mesopore templates comprises Template 1 and Template 2.

A sixteenth aspect may include any of the first to thirteenth aspects, wherein the two or more distinct organosilane mesopore templates comprises Template 3 and Template 4.

A seventeenth aspect may include any of the first to sixteenth aspects, wherein the crystallization is completed at a crystallization temperature greater than 140° C.

An eighteenth aspect may include any of the first to seventeenth aspects, wherein the molar ratio of the two or more distinct organosilane mesopore templates is selected to form mesoporous zeolites having a center of pore width distribution intermediate the centers of pore width distribution formed with each of the two or more distinct organosilane mesopore templates individually.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method of forming mesoporous zeolites with tunable pore widths, the method comprising:
   mixing a silicon-containing material, an aluminum-containing material, and at least a quaternary amine to produce a zeolite precursor solution;
   pre-crystallizing the zeolite precursor solution at a pre-crystallization temperature of greater than 125° C. and autogenous pressure to form a pre-crystallized zeolite precursor solution represented by the formation of an amorphous phase in pseud-steady-state where solid and solution phases approach equilibrium and silicate and aluminosilicate anion distributions are established;
   combining two or more distinct organosilane mesopore templates with the pre-crystallized zeolite precursor solution to produce a zeolite precursor gel, wherein the two or more distinct organosilane mesopore templates comprise one or more of the following templates:

crystallizing the zeolite precursor gel to produce a crystalline zeolite intermediate; and
   calcining the crystalline zeolite intermediate to produce the mesoporous zeolite, wherein the mesoporous zeolite comprises a BEA framework type.

2. The method of claim 1, wherein the crystalline zeolite intermediate is calcined by exposure to a temperature of at least 500° C.

3. The method of claim 1, wherein the two or more distinct organosilane mesopore templates both comprise compounds in accordance with R—Si(OR')$_3$, where R is an organic moiety and R' is an alkyl.

4. The method of claim 1, wherein the two or more distinct organosilane mesopore templates comprises the following templates:

-continued

5. The method of claim 1, wherein the two or more distinct organosilane mesopore templates comprises the following templates:

6. The method of claim 1, wherein the silicon-containing material comprises $SiO_2$, sodium silicate, tetramethylsiloxane, tetraethylsiloxane, silicon salt, silicon alkoxide, or combinations thereof.

7. The method of claim 1, wherein the aluminum-containing material comprises aluminum nitrate, aluminum sulfate, aluminum alkoxide, other aluminum salts, or combinations thereof.

8. The method of claim 1, wherein the quaternary amine is additionally combined with the pre-crystallized zeolite precursor solution along with the two or more distinct organosilane mesopore templates.

9. The method of claim 1, wherein the quaternary amine comprises tetraethylammonium hydroxide, tetraethylammonium alkoxide, tetrapropylammonium alkoxide, other alkaline materials comprising ammonium, or combinations thereof.

10. The method of claim 1, wherein the quaternary amine comprises tetraethylammonium hydroxide.

11. The method of claim 1, wherein the two or more distinct organosilane mesopore templates have a total loading of 0.5 mol % to 25 mol % with respect to the silicon-containing material.

12. The method of claim 1, wherein the two or more distinct organosilane mesopore templates have a total loading of 2.5 mol % to 10 mol % with respect to the silicon-containing material.

13. The method of claim 1, wherein two distinct organosilane mesopore templates at a molar ratio of 95:5 to 5:95 are combined with the pre-crystallized precursor solution.

14. The method of claim 1, wherein the crystallization is completed at a crystallization temperature greater than 140° C.

15. The method of claim 1, wherein the molar ratio of the two or more distinct organosilane mesopore templates is selected to form mesoporous zeolites having a center of pore width distribution intermediate the centers of pore width distribution formed with each of the two or more distinct organosilane mesopore templates individually.

* * * * *

UNITED STATES PATENT AND TRADEMARK OFFICE
CERTIFICATE OF CORRECTION

PATENT NO. : 11,007,511 B2
APPLICATION NO. : 15/974154
DATED : May 18, 2021
INVENTOR(S) : Sarah L. Kobaslija and Jeremy Thomas O'Brien Page 1 of 1

It is certified that error appears in the above-identified patent and that said Letters Patent is hereby corrected as shown below:

In the Claims

In Column 18, Line(s) 11, Claim 1: after "in", delete "pseud" and insert --pseudo--, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*